US009360885B2

(12) United States Patent
Ilyas et al.

(10) Patent No.: US 9,360,885 B2
(45) Date of Patent: Jun. 7, 2016

(54) FABRIC MULTIPATHING BASED ON DYNAMIC LATENCY-BASED CALCULATIONS

(71) Applicant: International Business Machines Corporation, Armonk, NY (US)

(72) Inventors: Talha J. Ilyas, San Jose, CA (US); Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/859,651

(22) Filed: Apr. 9, 2013

(65) Prior Publication Data

US 2014/0304543 A1    Oct. 9, 2014

(51) Int. Cl.
*G06F 1/00*    (2006.01)
*G06F 1/12*    (2006.01)
*G06F 1/16*    (2006.01)

(52) U.S. Cl.
CPC ............... *G06F 1/12* (2013.01); *G06F 1/1601* (2013.01); *G06F 1/1603* (2013.01)

(58) Field of Classification Search
CPC ........ G06F 1/12; G06F 1/1601; G06F 1/1603
See application file for complete search history.

(56) References Cited

U.S. PATENT DOCUMENTS

| 8,351,429 | B2 | 1/2013 | Assarpour |
| 8,842,781 | B2 | 9/2014 | Clevorn et al. |
| 2008/0304472 | A1* | 12/2008 | Gourlay et al. ............... 370/352 |
| 2009/0116489 | A1 | 5/2009 | Hanks |
| 2010/0290458 | A1 | 11/2010 | Assarpour |
| 2011/0200075 | A1 | 8/2011 | Clevorn et al. |
| 2012/0106339 | A1* | 5/2012 | Mishra .................. H04L 43/106 370/235 |

FOREIGN PATENT DOCUMENTS

| CN | 101141210 | 3/2008 |
| CN | 101888330 | 11/2010 |
| CN | 102163991 | 8/2011 |

OTHER PUBLICATIONS

Network Time Protocol, Feb. 14, 2012, en.wikipedia.org/wiki/Network_Time_Protocol.*
Precision Time Protocol, Apr. 6, 2012, https://en.wikipedia.org/wiki/Precision_time_protocol.*
International Search Report and Written Opinion from PCT application No. PCT/CN2014/074966 dated Jul. 16, 2014.

* cited by examiner

*Primary Examiner* — Jaweed A Abbaszadeh
*Assistant Examiner* — Austin Hicks
(74) *Attorney, Agent, or Firm* — Zilka-Kotab, PC (57) ABSTRACT

In one embodiment, a system for determining latency in paths includes logic integrated with and/or executable by a processor, the logic being adapted to synchronize clocks of two devices connected via two or more link aggregation (LAG) ports and/or multiple devices within paths through a network fabric, determine a transit delay for each LAG port and/or path, store the transit delay for each LAG port to a LAG structure along with an identifier for the LAG port and/or for each path to an equal cost multi-path (ECMP) structure along with an identifier of the path, sort the LAG ports according to each LAG port's transit delay and mark a LAG port having the lowest latency, and sort the paths according to each path's transit delay and mark a path having the lowest latency, wherein each path has an equal path cost factor.

20 Claims, 6 Drawing Sheets

FABRIC MULTIPATHING BASED ON DYNAMIC LATENCY-BASED CALCULATIONS

BACKGROUND

The present invention relates to data center infrastructure, and more particularly, this invention relates to providing dynamic latency-based calculations for links and paths through a network.

Institute of Electrical and Electronics Engineers (IEEE) publishes a multitude of standards, technical literature, and educational literature. IEEE 1588 provides for Precision Time Protocol (PTP) which is the facility of synchronizing clocks across a distributed Ethernet switching environment. After electing the master clock with the best stratum value (typically closer or closest to 1), the process of clock synchronization starts. As part of this process, transit delay is precisely calculated using a PTP delay_request packet which is sent and received by a device. This transit delay is precisely equal to the latency of the path traversed by the PTP delay_request packet.

For various data center and telecom applications, using the lowest latency path may be important. Typically, each Ethernet switch in a network relies on a parameter referred to as a "path cost factor" which is configured, e.g., by one or more administrators of the network. In addition, all of the bridging and routing protocols use this path cost factor to find the shortest path or the most preferred path between any two devices in the network. Many if not most of the multipath algorithms also rely on this parameter.

However, even though the path cost factors are configured based on highest speed or available bandwidth of each of the Ethernet ports or paths in the network, the actual latency for any path through the network may vary dramatically. A standard 10 GbE port from one switch may provide a very different latency than a standard 10 GbE port of another switch. Thus, even an end-to-end latency of any of these paths through the network selected by a multipath algorithm may be very different, regardless of the path cost factor of those two paths being the same.

In order to provide a level of service and redundancy expected of modern networks to data packets, a highly available and lower latency path solution should be provided.

SUMMARY

In one embodiment, a system for determining latency in paths includes logic integrated with and/or executable by a processor. The logic is adapted to synchronize clocks of two devices connected via two or more link aggregation (LAG) ports and/or multiple devices within paths through a network fabric, determine a transit delay for each LAG port and/or path, store the transit delay for each LAG port to a LAG structure along with an identifier for the LAG port and/or for each path to an equal cost multi-path (ECMP) structure along with an identifier of the path, sort the LAG ports according to each LAG port's transit delay and mark a LAG port having the lowest latency, and sort the paths according to each path's transit delay and mark a path having the lowest latency, wherein each path has an equal path cost factor.

In another embodiment, a method for determining latency in paths includes synchronizing a first clock of a first device and a second clock of a second device in a LAG across each of two or more LAG ports, determining a latency for each LAG port, storing the latency for each LAG port to a LAG structure along with an identifier for the LAG port, and sorting the LAG ports according to each LAG port's latency and marking a LAG port having the lowest latency.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, Institute of Electrical and Electronics Engineers (IEEE) 1588, which provides for Precision Time Protocol (PTP), may be used in conjunction with link aggregation (LAG) and/or equal cost multipathing (ECMP) or other multipathing mechanisms to provide a low latency, high availability path that is expected in modern networks.

In one general embodiment, a system for determining latency in paths includes logic integrated with and/or executable by a processor. The logic is adapted to synchronize clocks of two devices connected via two or more LAG ports and/or multiple devices within paths through a network fabric, determine a transit delay for each LAG port and/or path, store the transit delay for each LAG port to a LAG structure along with an identifier for the LAG port and/or for each path to an ECMP structure along with an identifier of the path, sort the LAG ports according to each LAG port's transit delay and mark a LAG port having the lowest latency, and sort the paths according to each path's transit delay and mark a path having the lowest latency, wherein each path has an equal path cost factor.

In another general embodiment, a method for determining latency in paths includes synchronizing a first clock of a first device and a second clock of a second device in a LAG across each of two or more LAG ports, determining a latency for each LAG port, storing the latency for each LAG port to a LAG structure along with an identifier for the LAG port, and sorting the LAG ports according to each LAG port's latency and marking a LAG port having the lowest latency.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
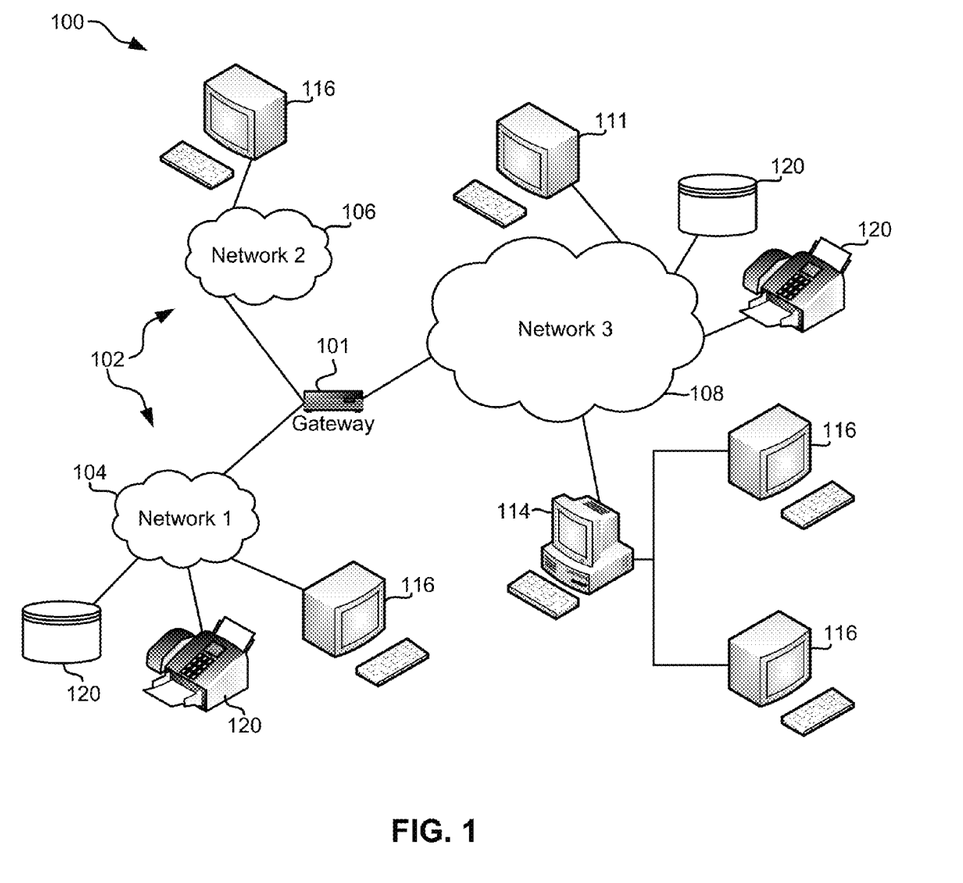
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
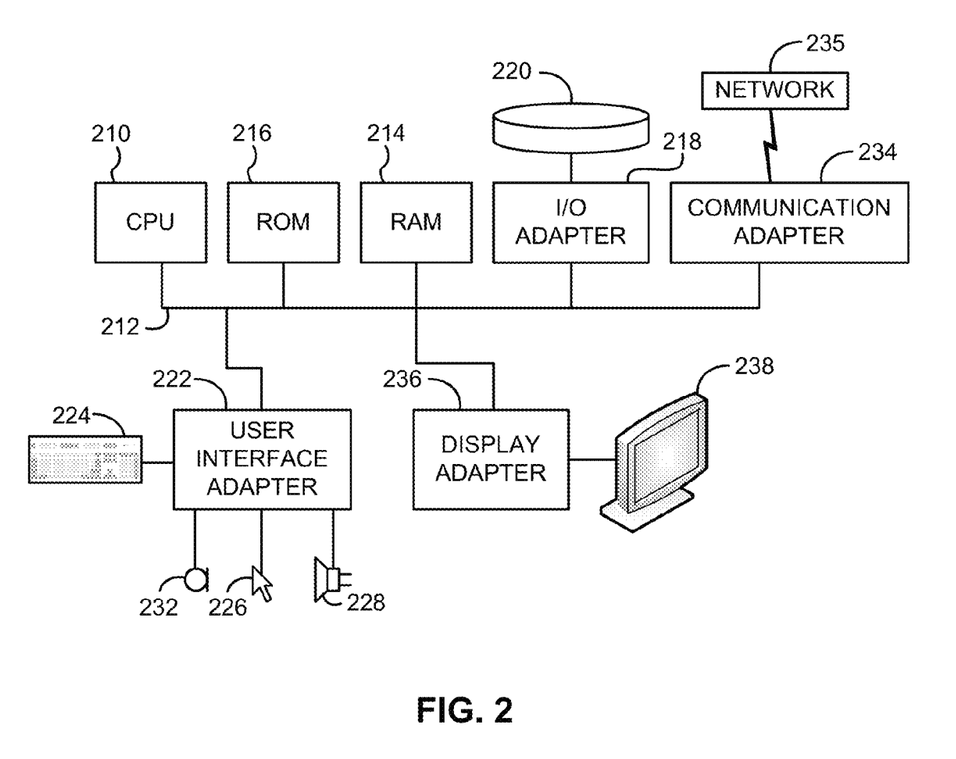
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Clock synchronization works in three stages, according to one embodiment. These stages include selection of a master clock, time synchronization, and delay request/response.

The master clock selection may depend upon a stratum of a chosen clock source. The stratum is an indication of the precision of the clock, and is assigned a layer number starting with zero as the highest stratum. The stratum level indicates how far removed from a reference clock, such as an atomic clock (stratum 0), a particular clock is. A more independent and precise clock source becomes the master clock, to which all other clocks are referenced. A clock with a stratum 1 may qualify as a universal nuclear clock with a precision of about $10^{-11}$ frames. Other less expensive clock sources with a high degree of precision may become the master clock of a network system having multiple switching devices in some embodiments.

Figure 3:
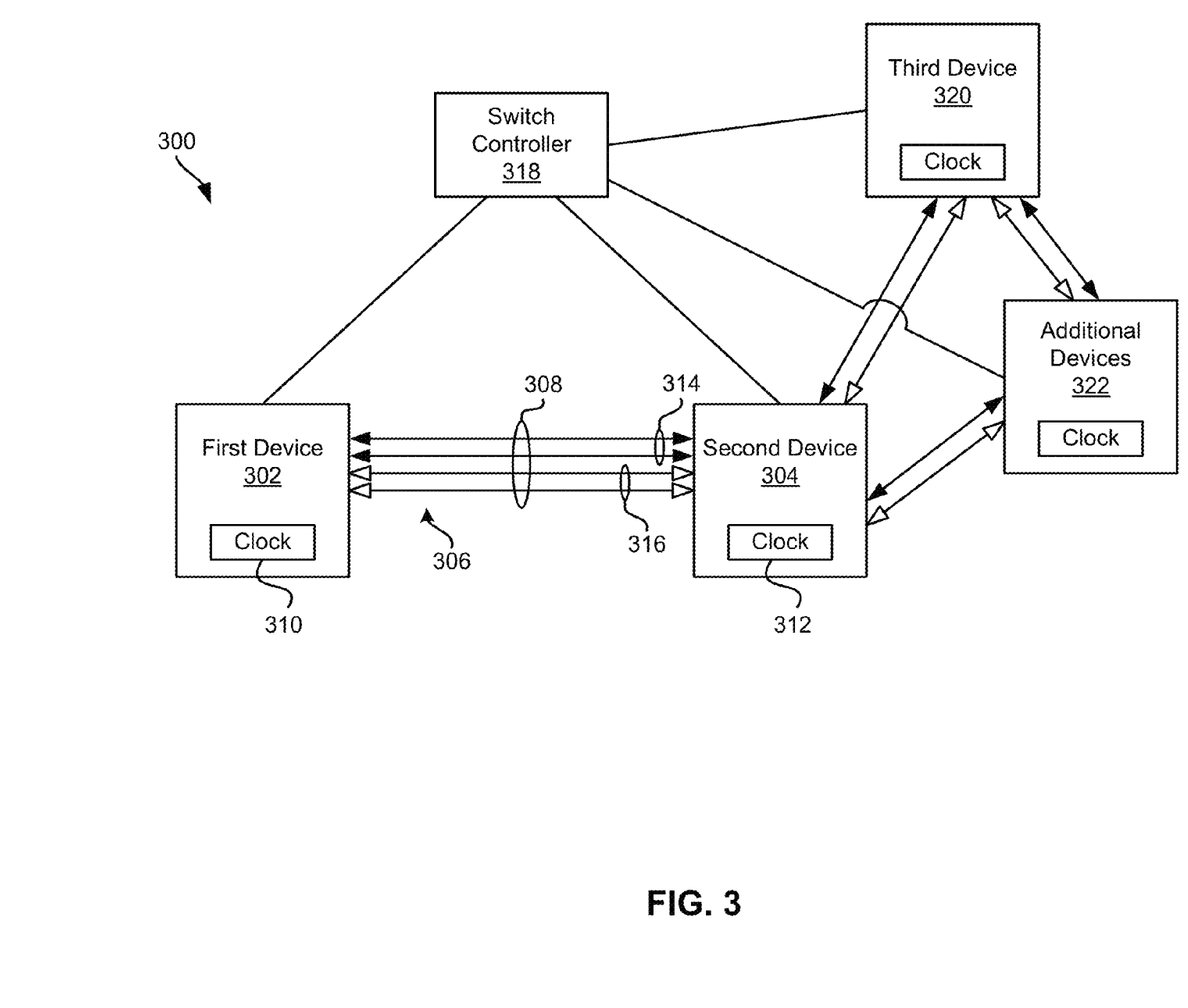
FIG. 3 is a simplified diagram of a network system, according to one embodiment.

Referring now to FIG. 3, a simplified diagram of a network system 300 is shown according to one embodiment. The network system 300 comprises a first device 302 connected to a second device 304 using a plurality of physical or virtual connections 306 organized in a physical or virtual link aggregation (LAG) 308. In addition, one or more additional devices 322 may be included in the network system 300, such as a third device 320. The first, second, and/or third devices may be virtual or physical devices, or a combination thereof. In addition, in some embodiments, a switch controller 318 may be in communication with one or more of the devices in the network system 300, with the switch controller 318 being adapted for controlling one or more operations, decisions, configuration settings, and/or responses of the devices. The switch controller 318 is capable of receiving information from each of the devices in the network system 300 that are capable of communicating with the switch controller 318, and is capable of sending information and/or commands to each of the devices in the network system 300 that are capable of communicating therewith.

In one embodiment, the switch controller 318 may be a software-defined network (SDN) controller, which may operate according to the OpenFlow standard or some other suitable application as would be known by one of skill in the art. The switch controller 318 may also be adapted to abstract the management and control planes for any devices (such as switches) in the network system 300 capable of communicating with the switch controller 318, e.g., SDN-compliant switches and other SDN-compliant devices.

Each of the devices 302, 304, 320 in the network system 300 and the switch controller 318 may comprise at least one processor for executing logic, such as a central processing unit (CPU), a field programmable gate array (FPGA), an integrated circuit (IC), an application specific integrated circuit (ASIC), or some other suitable processor(s) known in the art. In one embodiment, both a CPU and a switching ASIC may be provided in each device 302, 304, 320 thereby allowing for the separation of processing for switching tasks from processing for control plane and switch management tasks.

According to one embodiment, access control lists (ACLs) may be applied at the devices 302, 304, 320 (which may be servers, physical switches, etc.) and the switch controller 318, or elsewhere in the network system 300 to route incoming packets or overlay-encapsulated packets to receive appropriate treatment within the network system 300. Upon activation of such an ACL on a port of any device, any packets received on the ACL-activated port may be routed according to some predetermined routing scheme which causes the packet to receive certain service, protection, latency, etc.

The first device 302 includes a clock source 310. Similarly, the second device 304 includes a clock source 312. The clock sources 310, 312 may rely on a reference clock (not shown), which in one embodiment, is a clock having a stratum of 0 or 1. In another embodiment, either of the clock sources 310, 312 may act as the reference clock. In any case, the reference clock acts as a master clock, and the other clocks in the network system 300 act as slave clocks to the master clock, thereby ensuring that all clocks in the network system 300 are synchronized.

The network system 300 may use an overlay technology for encapsulating packets therein, in various approaches. Any overlay technology, standard, or protocol may be used, such as Virtual eXtensible Local Area Network (VXLAN), Distributed Overlay Virtual Ethernet (DOVE), Network Virtualization using Generic Routing Encapsulation (NVGRE), etc.

In the network system 300, one or more virtual networks may be included, with each virtual network using any number of virtual machines (VMs) therein. For example, the first device 302 may be a server hosting a plurality of VMs therein, as shown in FIG. 3. However, the first device 302 and the second device 304 are not so limited, as the devices may comprise any suitable networking component, such as a switch, a router, a server, a controller, etc.

In addition, each virtual network may share or have exclusive control over one or more VMs at any given time. By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

According to some approaches, when one or more packets, such as protocol data units (PDUs), are routed across multiple VLANs, the one or more packets may be routed through one or more intermediate devices. For example, a PDU from the first device 302 may be routed to the third device 320, assuming that the first and third devices are in different VLANs. In this case, the PDU may be routed through the second device 304 and/or additional devices 322. In addition, many different links between these devices may be utilized, each link having its own set of characteristics.

In this or any other embodiment, Equal-Cost Multi-Path (ECMP) helps to load balance L3-routed traffic between multiple routing paths having a same cost, based on a path cost factor for each path. Static LAG and link aggregation control protocol (LACP) LAG may be used to load balance L2-bridged traffic between multiple bridging links between two connected switches or devices. Links of different physical media, e.g., 10 Gigabit Ethernet (GbE) enhanced small form-factor pluggable (SFP+) and/or 10 GBase-T (IEEE 802.3an-2006) may be bundled together to form a LAG. Sometimes, even links of different speeds may be bundled to form a LAG.

FIG. 3, for example, shows two 10 GbE SFP+ ports 314 and two 10 GBaseT ports 316 bundled together to form a 4×10 GbE LAG 308. Note that since the member links may have different media type or speed, the latency of individual member ports may be vastly different even in a single LAG 308. 10 GBaseT ports usually involve PHY devices (connecting a link layer device to a physical medium) which adds significant latency to packet forwarding on that port. The latency may be as much as 200 nanoseconds (ns) more than an optical 10 GbE SFP+ port.

To resolve the issue of latency variation between multiple equal cost paths or multiple LAG members and to ensure that application traffic which demands a low latency path is sent over appropriate low latency paths even in a LAG or ECMP situation, the following algorithmic steps may be followed, in one embodiment.

Low latency LAG or ECMP member selection:
1. Two devices connected though LAG ports and/or multiple devices within ECMP paths initiate clock synchronization, such as via IEEE 1588;
2. Synchronization of clocks is performed for each individual LAG port and/or ECMP path starting at 1, and continuing to a total number of LAG ports N, and/or ECMP paths, P, such that clock synchronization is performed for every LAG port from 1 to N, and for every ECMP path from 1 to P;
3. A transit delay value is stored in the LAG structure and ECMP structure along with a port member indicator or path indicator;
4. The ports are sorted according to their individual latency values from low to high, with the lowest latency port in each LAG being marked;
5. The paths are sorted according to their individual latency values from low to high, with the lowest latency path in each ECMP being marked (which may be reserved for specific traffic, as desired); and
6. Every time a packet which demands low latency forwarding is received by the LAG or ECMP, the lowest latency port member of the LAG or path of the ECMP is used to forward the packet, otherwise, policies, such as ACLs or some other method of applying policies may be used to choose a port or path with an appropriate latency value for a received packet.

In one embodiment, the LAG ports are sorted according to their latencies prior to the ECMP paths being sorted. In this way, the LAG port latencies may be used in determining the latency of the ECMP paths. Furthermore, in some approaches, the network fabric may be determined after the LAG port latencies are determined, in order to provide the switch controller with more information with which to use in determining multiple paths through the network fabric.

In an additional algorithm, after all the devices in the network fabric determine their lowest latency LAG ports for each LAG:
1. Transparent clock synchronization mode is initiated (IEEE 1588);
2. All intermediate switches are forced to forward clock synchronization messages using their own lowest latency paths (either a switch controller forces this action, or a message is sent to each intermediate switch ahead of time to apprise the switch to send over its lowest latency lath);
3. For each ECMP path (from 1 to P), perform clock synchronization, such as using IEEE 1588;
4. Path delay for each path is determined;
5. Delay values for each path are stored in an ECMP structure for that path;
6. The paths are sorted in ascending order of path delay, with the lowest latency path being marked (which may be reserved for specific traffic, as desired);
7. For all packets and/or applications demanding lowest latency, the lowest latency path is chosen; otherwise, policies, such as ACLs or some other method of applying policies may be used to choose a path with an appropriate latency value for a received packet and/or application.

An appropriate latency port or path may be chosen as per a policy for a specific application and/or packet which is received, according to one approach.

Traffic which demands low latency links may include, in some embodiments, high frequency traffic (HFT) such as stock trades, high performance computing (HPC) such as processing clusters, forming server clusters, etc.

The slave clocks of one or more devices (slave devices) may be synchronized with the master clock of a device (master device) by exchanging messages therewith. In one approach, IEEE 1588 ("Precision Time Protocol") may be used for clock synchronization, either as stated in the IEEE standard 1588-2002 or 1588-2008, or in a modified version, as described in more detail herein.

According to one embodiment, a system for determining latency in paths comprises logic integrated with and/or executable by a processor. The logic may be hardware, software, or a combination of hardware and software. The processor may be a CPU, an ASIC, an FPGA, etc. The logic is adapted to synchronize clocks of two devices connected via a LAG and/or multiple devices within paths through a network fabric. Each LAG comprises two or more LAG ports, and each of the paths has an equal path cost factor such that the paths may be grouped together in an ECMP scheme. The logic is also adapted to determine a transit delay for each LAG port and/or path, store the transit delay for each LAG port to a LAG structure along with an identifier for the LAG port and/or for each path to an ECMP structure along with an identifier of the path, sort the LAG ports according to each LAG port's transit delay and mark a LAG port having the lowest latency, and sort the paths according to each path's transit delay and mark a path having the lowest latency. In this way, the lowest latency LAG port for each LAG, and the lowest latency path through the network fabric is determined.

In one embodiment, the clock synchronization may be performed via IEEE standard 1588-2002 or 1588-2008. In another embodiment, the logic may be further adapted to determine an offset between clocks of the two devices across each LAG port and/or an offset between clocks of intermediate devices and a source device in each path. As is described herein in more detail, latency is based on transit delay. Therefore, by determining the transit delay, the latency of each LAG port and each path may be determined.

In a further embodiment, the logic may be adapted to send a synchronization message from a first device to a second device at a first time, $T(M)(1)$, receive the synchronization message from the first device at the second device at a second time, $T(S)(2)$, and calculate a difference between the times, such that $Offset=T(S)(2)-T(M)(1)$. After this offset is determined, the logic may be adapted to determine the offset for each LAG port periodically by sending a follow-up message from the first device to the second device at a third time, $T(M)(3)$, receiving the follow-up message from the first device at the second device at a fourth time, $T(S)(4)$, and calculating a difference between the times, such that $Offset=T(S)(4)-T(M)(3)$.

According to one approach, the offset for each LAG port and/or the offset in each path may be determined every tenth of a second.

In another embodiment, the logic may be further adapted to receive a packet, determine whether the packet demands low latency service, and forward the packet using the LAG port having the lowest latency when the packet demands low latency service; otherwise choose a LAG port to forward the packet other than the LAG port with the lowest latency.

Figure 4A:
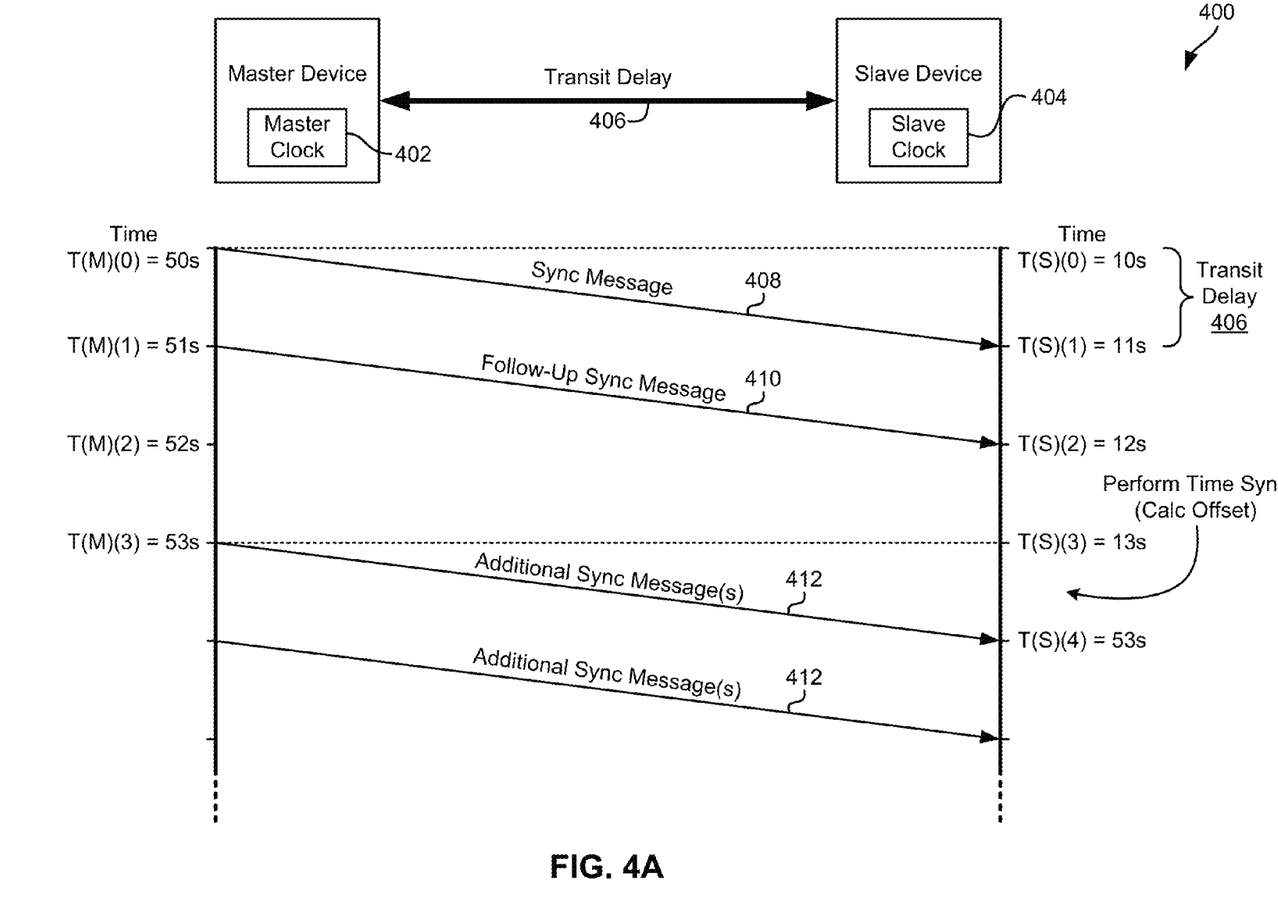
FIG. 4A is a simple time diagram which illustrates the exchange of messages for clock synchronization, according to one embodiment.

A simple time diagram 400 is shown in FIG. 4A, according to one embodiment, to illustrate this exchange of messages. As this diagram 400 shows, communication between the master device (having the master clock 402) and a slave device (having a slave clock 404) suffers from transit delay 406. In this example, it may be assumed that the transit delay 406 is 1 second (s); however, any amount of delay is possible, and the delay may not be a constant value for each communication between the slave and master devices.

This time diagram 400 is shown to help illustrate concepts that are used in clock synchronization for master/slave operation, according to various embodiments. However, other arrangements are possible which are not explicitly shown in FIG. 4A, such as a plurality of slave devices, more or less transit delay, intermediate devices between the master device and slave devices thereof, etc.

To begin with each clock may have a different time which should be synchronized. For example, and these values are for exemplary purposes only and not limiting on the embodiments in any way, the master clock 402 may have a time of $T(M)(0)=50$ s to begin with, while the slave clock 404 may have a time $T(S)(0)=10$ s, which shows a significant synchronization offset of 40 s.

As FIG. 4A shows, in one example, in order to establish clock synchronization, a synchronization (sync) message 408 may be sent from the master device to the slave device at time $T(M)(0)=50$ s which corresponds with time $T(S)(0)=10$ s. The slave device receives this sync message 408 after the transit delay 406 at time $T(S)(1)=11$ s. To further establish the timing of the master clock 402, a follow-up sync message 410 is sent at some predetermined later time (here the delay is one second, but any suitable delay may be used), such as at time $T(M)(1)=51$ s, which is received by the slave device at time $T(S)(2)=12$ s. In this way, the offset may be calculated, which includes the transit delay (which is not solved separately). In this example, $Offset=T(S)(2)-T(M)(1)-Transit\_Delay$, such that $Offset=12$ s$-51$ s$-(Transit\_Delay,$ assumed to be $0)=-39$ s. Therefore, the adjusted slave clock time $T(S')(1)=T(S)(1)-Offset=11$ s$-(-39$ s$)=50$ s, which synchronizes the master and slave clocks to have the same time (not counting for transit delay 406).

In one approach, one or more additional sync messages 412 may be sent, at any predetermined later time and/or periodically every predetermined amount of time, such as at time $T(M)(3)=53$ s which corresponds with $T(S)(3)=52$ s, which is received at the slave device at time $T(S)(4)=53$ s, thereby corresponding to the clocks being synchronized with the transit delay 406 being included in the synchronization, as the additional sync message 412 was sent at time $T(M)(3)=53$ s and received at $T(S)(4)=53$ s. For example, $Offset=T(S)(4)-T(M)(3)$, such that $Offset=53$ s$-53$ s$=0$ s. Therefore, the adjusted slave clock time $T(S')(4)=T(S)(4)-Offset=53$ s$-(0$ s$)=53$ s, which indicates that the master and slave clocks are synchronized to have the same time (not counting for transit delay 406).

However, in this process, as can be seen, the clocks are still offset by the transit delay amount.

Since the transit delay 406 may be calculated from the variables and parameters already known in this synchronization operation, it is beneficial to actually calculate this transit delay 406 to remove its uncertainty from the network, and such that it may be used in other calculations, such as to setup a network fabric, choose low latency paths, etc.

Figure 4B:
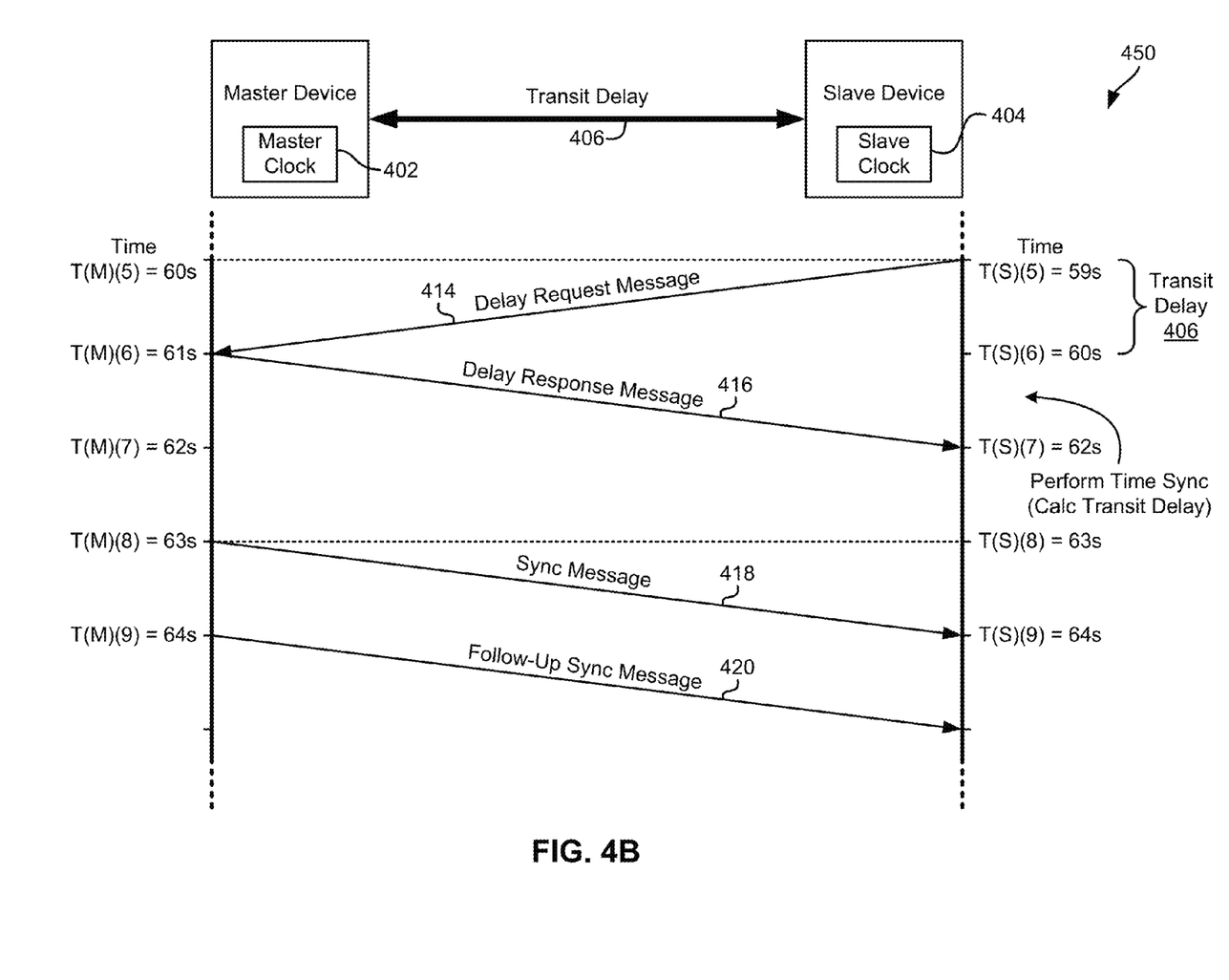
FIG. 4B is a simple time diagram which illustrates the exchange of messages for clock synchronization, according to another embodiment.

Now referring to FIG. 4B, a time diagram 450 is shown assuming a continuation from FIG. 4A to help illustrate concepts that are used in clock synchronization for master/slave operation, according to various embodiments. Referring again to FIG. 4B, at time $T(M)(5)=60$ s which corresponds to a time of $T(S)(5)=59$ s, a delay request 414 is sent from the slave device to the master device. The delay request 414 is received by the master device at time $T(M)(6)=61$ s. Then, a delay response 416 is sent from the master device to the slave device, which is received at time $T(S)(7)=62$ s. To calculate the transit delay 406, the following equation may be used: $Transit\_Delay=(T(S)(4)-T(M)(3))+T(M)(6)-T(S)(5))/2=(53$ s$-53$ s$+61$ s$-59$ s$)/2=2$ s$/2=1$ s. Therefore, the transit delay 406 may be calculated as 1 s, which corresponds with our assumed value.

In addition, the offset may also be updated periodically, to ensure that drift does not occur and the clocks remain in synchronization. For example, for sync message 418 and follow-up sync message 420, the previous calculations may be repeated to ensure synchronization. However, in this case, since the transit delay is now known, it may be added into the equation, such that: Offset=T(S)(9)−T(M)(8)−Transit_Delay=64 s−63 s−1 s=0 s. Therefore, since offset is equal to zero, the clocks are synchronized and no adjusted slave clock time is needed to be calculated.

Of course, in some embodiments, additional sync messages 412 and additional delay request 414/delay response 416 messages may be exchanged, in an attempt to repeat the synchronization operation, as conditions may change over time which will affect the offset and/or transit delay 406, and adjustments may be made dynamically over the use of the network system in the master/slave arrangement.

A frequency for exchanging the time sync messages is programmable, in one approach, and may have a default value from just more than 0 millisecond (ms) to 100 ms or greater. In various approaches, a default value for the frequency may be greater than 5 ms and less than or equal to 100 ms, such that time sync messages are exchanged every 10 ms, every 15 ms, every 25 ms, every 50 ms, every 80 ms, etc., and/or whenever it is determined that the transit delay should be updated, such as when a topology change occurs, etc.

In FIG. 4B, the transit delay 406 indicates the latency of the transit path. The transit path may be single L2 hop (devices located adjacent one another in a network) or may include multiple hops and/or switches in the transit path. In a transparent clock mechanism, the sync messages (408, 410, 412 in FIG. 4A) may cross Layer-3 (L3) domains; hence, these messages may cross multiple hops. Thus, as shown in FIG. 4B, the transit delay 406 in a situation where L3 domains are crossed provides the transit delay 406 (latency) of the whole path across the multiple hops.

In addition, as compared to more conventional methods, an extension to master/slave operation may cause the delay request 414 to be sent more frequently, in order to dynamically calculate the transit delay 406 and latency. In order to find the latency of a path more precisely at any given time, the delay request 414 may be sent more frequently and hence, the transit delay 406 may be calculated over smaller time intervals. This causes the transit delay 406 to be more precise at each time instance. Since the path latency may change dynamically depending upon the traffic load, link configuration changes, link failures, etc., this provides for an advantage over conventional systems and methods where the transit delay is not calculated as frequently.

A SDN controller of a network fabric may use the previously described algorithm to find the latency of any selected path by initiating IEEE 1588 state machines on all the switches in the selected path. In this way, the SDN controller may learn the latency of any selected path in its fabric, thereby allowing the SDN controller to choose appropriate paths therethrough based on requirements and/or criteria of a packet received at a member switch.

The SDN controller, may create a fabric topology in which low latency multiple paths in the network fabric are determined in an initial setup and updated dynamically during use of the network fabric and switches therein. Such selected low-latency paths (and all other paths determined during fabric topology determination) may then be written in the form of flows and/or rules in the ternary content-addressable memories (TCAMs) of the devices and/or switches in the network fabric. Using these paths, network switches may switch received traffic for the low latency applications separately from other, non-low-latency traffic.

Figure 5:
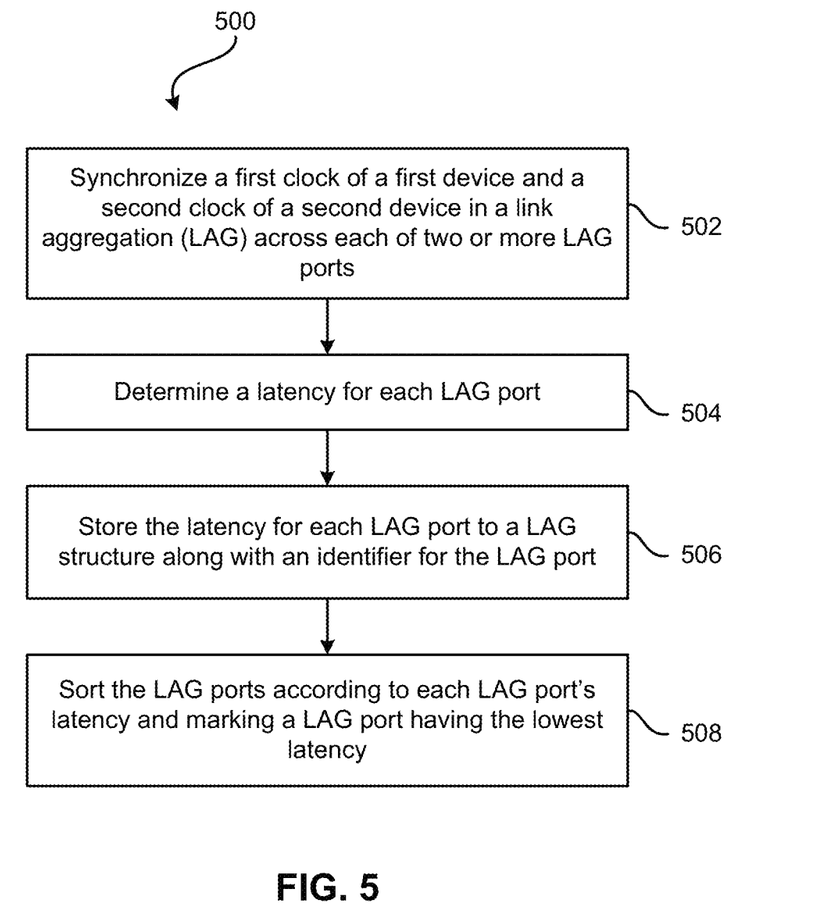
FIG. 5 is a flowchart of a method, according to one embodiment.

Now referring to FIG. 5, a flowchart of a method 500 for determining latency in paths or ports is shown, according to one embodiment. The method 500 may be performed in accordance with the present invention in any of the environments depicted in FIGS. 1-4B, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a switch controller (such as a SDN controller, OpenFlow controller, etc.), a virtual network controller such as a distributed overlay virtual Ethernet (DOVE) controller, an overlay-capable network device, a processor (such as a CPU, an ASIC, an FPGA, etc.), a gateway, an OpenFlow-capable switch, an OpenFlow controller, or some other suitable device, in various approaches.

As shown in FIG. 5, method 500 may initiate with operation 502, where a first clock of a first device and a second clock of a second device in a LAG are synchronized across each of two or more LAG ports. In this way, the clocks of two devices are synchronized across each LAG port of the LAG, thereby allowing for the latency of each LAG port to be determined.

In operation 504, a latency for each LAG port is determined. The latency may be based on a transit delay of the individual LAG port for which the latency is being determined.

In operation 506, the latency for each LAG port is stored to a LAG structure along with an identifier for the LAG port. The identifier may be a string or grouping of characters which uniquely identifies the LAG port versus other LAG ports in the network. In one embodiment, the LAG port identifier may also identify the LAG and the two devices which are connected via the LAG, and any other useful information about the LAG port, the LAG, and/or the two devices.

In operation 508, the LAG ports are sorted according to each LAG port's latency. Furthermore, a LAG port having the lowest latency is marked for quicker access thereto in case low latency traffic is to be forwarded.

In one embodiment, the clock synchronization may be performed via IEEE standard 1588-2002 or 1588-2008. For example, Precision Time Protocol (PTP) may be used to exchange messages to determine offset between clocks of the devices, thereby allowing for the clocks to be synchronized.

In one approach, the clock synchronization may include determining an offset between the first clock and the second clock across each LAG port (such as by exchanging PTP messages), and determining a transit delay for each LAG port. The latency for each LAG port may be based on the transit delay for each LAG port.

In another approach, the first clock or the second clock may act as the master clock in the clock synchronization. In an alternate approach, a clock source having a stratum of zero or one (which is not a part of the first or second device) may act as the master clock in the clock synchronization. This clock source may be external to the first and second devices, and may be a resource clock for the network.

According to one embodiment, the offset between the first clock and the second clock may be determined for each LAG port by: sending a synchronization message from the first device to the second device at a first time, T(M)(1); receiving the synchronization message from the first device at the second device at a second time, T(S)(2); and calculating a difference between the times, such that Offset=T(S)(2)−T(M)(1).

In a further embodiment, the offset between the first clock and the second clock may be determined periodically for each LAG port by: sending a follow-up message from the first device to the second device at a third time, T(M)(3); receiving the follow-up message from the first device at the second device at a fourth time, T(S)(4); and calculating a difference between the times, such that Offset=T(S)(4)−T(M)(3).

In one approach, the offset between the first clock and the second clock for each LAG port may be determined every tenth of a second, half a second, second, and/or more or less frequently based on usage, application, user settings, and/or when the network experiences a topology change.

The method 500 may further include, in one embodiment, receiving a packet, determining whether the packet demands low latency service, and forwarding the packet using the LAG port having the lowest latency when the packet demands low latency service; otherwise choosing a LAG port to forward the packet other than the LAG port with the lowest latency.

In another embodiment, the method 500 may include initiating transparent clock synchronization mode after a lowest latency path is determined for each LAG in a network fabric. The network fabric comprises a plurality of devices interconnected with LAGs with multiple paths therethrough having an equal cost factor, thereby allowing ECMP to be utilized. Each path through the network fabric from a source device which has an equal path cost factor is determined, all intermediate devices in each path are forced to forward clock synchronization messages using their lowest latency LAG port, clock synchronization is performed for each path, a latency for each path is determined, the latency for each path is stored to an ECMP structure along with an identifier for the path, and the paths are sorted according to each path's latency and a path having the lowest latency is marked for quicker reference thereto. This allows for the paths through the network to be determined based not only on path cost factor, but also based on latency, without requiring additional traffic to be exchanged through the network besides messages used for clock synchronization.

In another embodiment, the method 500 may include receiving a packet or a request from an application, determining whether the packet or the application demands low latency service, and forwarding the packet or request using the path having the lowest latency when the packet or request demands low latency service; otherwise choosing a path to forward the packet or request other than the path with the lowest latency.

In one approach, the timing for the exchange of time sync messages is programmable, and may occur every 100 ms or less, such as every 10 ms, every 15 ms, every 50 ms, etc., and/or whenever it is determined that the latency for each path should be updated, such as when a topology change occurs, etc.

Furthermore, a fabric may be formed based on at least a latency of each LAG port and a latency of each path through the network, after these parameters have been determined using method 500. In this way, a switch controller (such as a SDN controller, OpenFlow controller, etc.) may form the fabric which takes into account not just the path cost factor of each path and speed or bandwidth of each LAG port, but also the latency of every LAG port and every path through the network to achieve a more efficient and optimum fabric for egress and ingress of packets therethrough. This enhanced fabric is capable of achieving even greater control of links, paths, and packet forwarding than a fabric formed without taking into account path and link latencies, as would be understood by one of skill in the art upon reading the present descriptions, and does not add additional traffic to the network, because the latency may be determined using the clock synchronization messages already exchanged, with a modification to allow for transit delay to be calculated.

According to one embodiment, the first and second devices may be switches that are capable of communicating with a switch controller, such as a SDN controller. In a further embodiment, the first and second devices may operate according to OpenFlow standards, as would be understood by one of skill in the art.

According to another embodiment, the first and second devices may be switches that are capable of providing overlay functionality to packets received and sent by each switch, e.g., they are overlay-capable switches. Any overlay protocol and/or technology or standards may be used, such as VXLAN, DOVE, NVGRE, etc.

According to various embodiments, method 500 may be implemented in a system or computer program product, as would be appreciated by one of skill in the art upon reading the present descriptions.

In another exemplary embodiment, a computer program product for determining latency in paths or ports may comprise a computer readable storage medium having computer readable program code embodied therewith. The computer readable program code may comprise computer readable program code configured to execute one or more of the operations of method 500. Furthermore, any of the embodiments and/or approaches described in relation to method 500 may be included in the computer program product.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system comprising logic integrated with a processor, the logic being configured to:
    synchronize clocks of two intermediate devices across a plurality of link aggregation (LAG) ports 1 to N therebetween, wherein N is at least 2, and wherein the clock synchronization is performed independently across each of the LAG ports;
    determine a latency for each LAG port based on information derived from synchronizing the clocks of the two intermediate devices;
    store the latency for each LAG port to a LAG structure along with an identifier of a corresponding LAG port and mark a LAG port having a lowest latency;
    discover a configuration of a network fabric after determining the latency for each LAG port;
    synchronize clocks of two devices across a plurality of paths 1 to P connecting the two devices through the network fabric, wherein P is at least 2, wherein each path has an equal path cost factor, and wherein the clock synchronization is performed independently across the plurality of paths connecting the two devices in the network fabric;
    determine a transit delay for each path of the plurality of paths connecting the two devices in the network fabric based on information derived from synchronizing the clocks of the two devices and the latency for LAG ports included in the plurality of paths;
    store the transit delay for each path of the plurality of paths connecting the two devices in the network fabric to an equal cost multi-path (ECMP) structure along with an identifier for each path of the plurality of paths connecting the two devices in the network fabric;

and sort the plurality of paths connecting the two devices in the network fabric in the ECMP structure according to each path's transit delay and mark a path having a lowest latency.

2. The system as recited in claim 1, wherein the clock synchronization is performed via Institute of Electrical and Electronics Engineers (IEEE) standard 1588-2002 and/or 1588-2008.

3. The system as recited in claim 1, wherein the logic is further configured to determine an offset between clocks of the two devices across each path of the plurality of paths and an offset between clocks of intermediate devices and a source device in each path of the plurality of paths connecting the two devices in the network fabric, wherein latency is based on transit delay determined during the clock synchronization.

4. The system as recited in claim 3, wherein the logic is further configured to:
- cause a first device to send a synchronization message to a second device at a first time, T(M)(1), across each path of the plurality of paths connecting the two devices in the network fabric;
- determine a second time, T(S)(2), at which each synchronization message is received at the second device across each path of the plurality of paths connecting the two devices in the network fabric; and
- calculate a difference between the second time and the first time, such that Offset=T(S)(2)−T(M)(1), for each path of the plurality of paths connecting the two devices in the network fabric.

5. The system as recited in claim 4, wherein the logic is further configured to determine the offset between clocks of the two devices across each path of the plurality of paths periodically by:
- causing the first device to send a follow-up message to the second device at a third time, T(M)(3), across each path of the plurality of paths;
- determining a fourth time, T(S)(4), at which each follow-up message is received at the second device across each path of the plurality of paths; and
- calculating a difference between the fourth time and the third time, such that Offset=T(S)(4)−T(M)(3), for each path of the plurality of paths.

6. The system as recited in claim 1, wherein the transit delay for each path connecting the two devices in the network fabric is determined every tenth of a second, and wherein the path having the lowest latency is updated in response to determining the transit delay for each path of the plurality of paths connecting the two devices in the network fabric.

7. The system as recited in claim 1, wherein the logic is further configured to:
- receive a packet;
- determine whether the packet demands low latency service;
- forward the packet using the path marked as having the lowest latency in response to a determination that the packet demands low latency service; and
- choose a path to forward the packet other than the path marked as having the lowest latency in response to a determination that the packet does not demand low latency service.

8. A method comprising:
- a processor synchronizing clocks of two intermediate devices across a plurality of link aggregation (LAG) ports 1 to N therebetween, wherein N is at least 2, and wherein the clock synchronization is performed independently across each of the LAG ports;
- determining a latency for each LAG port based on information derived from synchronizing the clocks of the two intermediate devices;
- storing the latency for each LAG port to a LAG structure along with an identifier of a corresponding LAG port and mark a LAG port having a lowest latency;
- discovering a configuration of a network fabric after determining the latency for each LAG port;
- the processor synchronizing a first clock of a first device and a second clock of a second device across a plurality of paths connecting the first device with the second device through a network fabric, wherein the first clock and the second clock are synchronized independently across the paths connecting the first device with the second device, including independently across each link aggregation (LAG) port of at least one (LAG) included in at least one of the paths connecting the first device with the second device;
- determining a latency for each path of the plurality of paths connecting the first device with the second device in the network fabric based on information derived from synchronizing the first and second clocks and the latency for LAG ports included in the plurality of paths;
- the processor storing the latency for each path of the plurality of paths connecting the first device with the second device in the network fabric to an equal cost multi-path (ECMP) structure along with an identifier for each path of the plurality of paths connecting the first device with the second device in the network fabric; and
- the processor sorting the plurality of paths according to each path's latency and marking a path having a lowest latency.

9. The method as recited in claim 8, wherein the clock synchronization is performed via Institute of Electrical and Electronics Engineers (IEEE) standard 1588-2002 or 1588-2008.

10. The method as recited in claim 8, wherein the clock synchronization comprises:
- the processor determining an offset between the first clock and the second clock across each path of the plurality of paths connecting the first device with the second device in the network fabric; and
- the processor determining a transit delay for each path of the plurality of paths connecting the first device with the second device in the network fabric,
- wherein the latency for each path of the plurality of paths connecting the first device with the second device in the network fabric is based on the transit delay for the path.

11. The method as recited in claim 10, wherein the first clock acts as a master clock in the clock synchronization.

12. The method as recited in claim 10, wherein a clock source having a stratum of zero or one acts as a master clock in the clock synchronization.

13. The method as recited in claim 10, wherein the offset between the first clock and the second clock is determined for each path of the plurality of paths connecting the first device with the second device in the network fabric by:
- causing the first device to send a synchronization message to the second device at a first time, T(M)(1), across each path of the plurality of paths connecting the first device with the second device in the network fabric;
- determining a second time, T(S)(2), at which each synchronization message is received at the second device across each path of the plurality of paths connecting the first device with the second device in the network fabric; and calculating a difference between the second time and the first time, such that Offset=T(S)(2)−T(M)(1), for each path of the plurality of paths connecting the first device with the second device in the network fabric.

14. The method as recited in claim 13, wherein the offset between the first clock and the second clock is determined periodically for each path connecting the first device with the second device in the network fabric by:
causing the first device to send a follow-up message to the second device at a third time, T(M)(3), across each path of the plurality of paths connecting the first device with the second device in the network fabric;
determining a fourth time, T(S)(4), at which each follow-up message is received at the second device across each path of the plurality of paths connecting the first device with the second device in the network fabric; and
calculating a difference between the fourth time and the third time, such that Offset=T(S)(4)−T(M)(3), for each path of the plurality of paths connecting the first device with the second device in the network fabric.

15. The method as recited in claim 8, wherein the latency for each path of the plurality of paths connecting the first device with the second device in the network fabric is determined every tenth of a second.

16. The method as recited in claim 8, further comprising:
receiving first and second packets;
the processor determining whether the first and second packets demand low latency service;
forwarding the first packet using the path having the lowest latency in response to a determination that the first packet demands low latency service; and
choosing a path to forward the second packet other than the path marked as having the lowest latency in response to a determination that the second packet does not demand low latency service.

17. A method comprising:
a processor determining a lowest latency link aggregation (LAG) port for each (LAG) in any path of a plurality of paths connecting a first device with a second device;
discover a configuration of a network fabric connecting the first device to the second device after determining the lowest latency LAG port for each LAG therein, wherein the network fabric comprises a plurality of devices interconnected with LAGs;
performing clock synchronization for each path of the plurality of paths;
the processor determining a latency for each path of the plurality of paths based on the clock synchronization and the lowest latency LAG port for each LAG included in the plurality of paths;
storing the latency for each path of the plurality of paths to an equal cost multi-path (ECMP) structure along with an identifier for the path; and
sorting the plurality of paths according to each path's latency and marking a path having a current lowest latency after each clock synchronization is performed.

18. The method as recited in claim 17, further comprising:
forcing an intermediate device in each path of the plurality of paths to forward clock synchronization messages using a lowest latency LAG port of the intermediate device.

19. The method as recited in claim 17, further comprising:
receiving first and second transmissions of data, wherein each of the first and second transmissions of data is a packet or a request from an application;
determining whether the first and second transmissions of data demand low latency service; and
forwarding the first transmission of data using the path having the lowest latency in response to a determination that the first transmission of data demands low latency service; and
choosing a path to forward the second transmission of data other than the path with the lowest latency in response to a determination that the second transmission of data does not demand low latency service.

20. The method as recited in claim 17, wherein the latency for each path is determined every tenth of a second.

\* \* \* \* \*